United States Patent
Lin et al.

(10) Patent No.: US 12,494,080 B2
(45) Date of Patent: Dec. 9, 2025

(54) DEVICES CONFIGURED FOR NEAR-FIELD ULTRASONIC IMAGING

(71) Applicant: QUALCOMM Incorporated, San Diego, CA (US)

(72) Inventors: Shiang-Chi Lin, Taoyuan (TW); Jessica Liu Strohmann, Cupertino, CA (US); Hrishikesh Vijaykumar Panchawagh, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 15 days.

(21) Appl. No.: 18/611,365

(22) Filed: Mar. 20, 2024

(65) Prior Publication Data
US 2024/0338964 A1    Oct. 10, 2024

Related U.S. Application Data

(60) Provisional application No. 63/494,152, filed on Apr. 4, 2023.

(51) Int. Cl.
G06V 40/13 (2022.01)
B06B 1/06 (2006.01)

(52) U.S. Cl.
CPC ........ G06V 40/1306 (2022.01); B06B 1/0688 (2013.01)

(58) Field of Classification Search
CPC .................................................. G06V 40/1306
See application file for complete search history.

(56) References Cited

U.S. PATENT DOCUMENTS

| | | | |
|---|---|---|---|
| 2013/0165597 A1* | 6/2013 | Kim ................... | C08G 18/6229 |
| | | | 525/342 |
| 2017/0323130 A1* | 11/2017 | Dickinson .......... | G06V 40/1306 |
| 2017/0364726 A1* | 12/2017 | Buchan .............. | G01N 29/2437 |
| 2019/0354738 A1* | 11/2019 | Baek .................. | G06F 1/163 |
| 2021/0004555 A1* | 1/2021 | Panchawagh ........ | H10N 30/302 |
| 2022/0004728 A1* | 1/2022 | Strohmann ........ | G06V 40/1306 |
| 2022/0392816 A1* | 12/2022 | Oh ...................... | G06F 1/1616 |
| 2023/0045063 A1* | 2/2023 | Sunwoo ............... | B32B 27/32 |
| 2023/0063693 A1 | 3/2023 | Lin et al. | |
| 2024/0147642 A1* | 5/2024 | Ryu .................... | G06V 40/1329 |

OTHER PUBLICATIONS

International Search Report and Written Opinion—PCT/US2024/022646—ISA/EPO—Jul. 12, 2024.

* cited by examiner

*Primary Examiner* — Yuzhen Shen
(74) *Attorney, Agent, or Firm* — QUALCOMM Incorporated

(57) ABSTRACT

Some disclosed devices include a display system having a display stack, an ultrasonic fingerprint sensor system including an ultrasonic fingerprint sensor system stack and a stiffener layer residing between the display stack and the ultrasonic fingerprint sensor system stack. In some examples, the stiffener layer may have a stiffener layer thickness that allows the ultrasonic fingerprint sensor system to operate in a near-field mode. According to some examples, operating in the near-field mode may involve transmitting ultrasound having a peak frequency in a range from 1 megahertz (MHz) to 6 MHz.

29 Claims, 5 Drawing Sheets

DEVICES CONFIGURED FOR NEAR-FIELD ULTRASONIC IMAGING

RELATED APPLICATIONS

This application claims the benefit of U.S. Provisional Application No. 63/494,152, filed Apr. 4, 2023, entitled "DEVICES CONFIGURED FOR NEAR-FIELD ULTRASONIC IMAGING", which is assigned to the assignee hereof, and incorporated herein in its entirety by reference.

TECHNICAL FIELD

This disclosure relates generally to devices that include ultrasonic fingerprint sensor systems.

DESCRIPTION OF THE RELATED TECHNOLOGY

Biometric authentication can be an important feature for controlling access to devices, etc. Many existing products include some type of biometric authentication, including but not limited to fingerprint-based authentication. Although some existing fingerprint-based authentication methods and devices can provide satisfactory performance, improved methods and devices would be desirable.

SUMMARY

The systems, methods and devices of the disclosure each have several innovative aspects, no single one of which is solely responsible for the desirable attributes disclosed herein.

One innovative aspect of the subject matter described in this disclosure may be implemented in an apparatus. In some examples, the apparatus may be, or may include, a foldable display device. The apparatus may include a display system including a display stack, an ultrasonic fingerprint sensor system including an ultrasonic sensor system stack and a stiffener layer residing between the display stack and the ultrasonic sensor system stack. According to some examples, the apparatus may be configured to allow the ultrasonic sensor system to operate in a near-field mode. In some examples, the ultrasonic sensor system may transmit ultrasonic waves having a peak frequency in the range from 1 megahertz (MHz) to 6 MHz when operating in the near-field mode. According to some examples, the stiffener layer may have a thickness configured to allow the ultrasonic fingerprint sensor system to operate in the near-field mode. In some such examples, the stiffener layer thickness may be less than one-fifth of a wavelength corresponding to the peak frequency.

According to some examples, operation of the ultrasonic fingerprint sensor system in the near-field mode may provide a resolution of at least 3 line pairs per millimeter. In some examples, the stiffener layer thickness may correspond with a transmission coefficient in a range from 10 percent to 30 percent for ultrasonic waves in the range from 1 MHz to 6 MHz. According to some examples, the stiffener layer may include stainless steel, titanium, aluminum, carbon fiber reinforced polymer (CFRP), glass fiber reinforced polymer (GFRP), or combinations thereof. In some examples, the stiffener layer may include a stainless steel layer, a titanium layer, a CFRP layer or a GFRP layer having a thickness in a range from 30 microns to 200 microns, or an aluminum layer having a thickness in a range from 100 microns to 300 microns.

In some examples, the foldable display device may include an adhesive layer residing on a side of the stiffener layer proximate the display stack. The adhesive layer may have a thickness of less than 100 microns. According to some examples, the display stack may include a display glass layer residing between the stiffener layer and an outer surface of the foldable display device. The display glass layer may include glass, transparent plastic, or a combination thereof. In some examples, a first acoustic resonator may be bounded by the stiffener layer and the display glass layer. According to some examples, the first acoustic resonator may be configured to cause a first local maximum of ultrasonic wave transmission. In some examples, the first acoustic resonator may include at least one first-resonator flexible optically clear adhesive (OCA) layer. In some such examples, at least one first-resonator flexible OCA layer may have a thickness that is substantially an odd or even multiple of one-eighth of a wavelength corresponding to ultrasonic waves in the range from 1 MHz to 14 MHz, where substantially indicates being within plus or minus 10 percent.

According to some such examples, the foldable display device may include one or more layers residing between the display glass layer and the outer surface of the foldable display device. In some such examples, a second acoustic resonator may include the one or more layers and the display glass layer. According to some such examples, the one or more layers may include a second-resonator flexible optically clear adhesive (OCA) layer, which may have a thickness in a range from 5 microns to 180 microns.

In some examples, the ultrasonic fingerprint sensor system may include a thin film transistor (TFT) layer or a semiconductor layer. According to some examples, an acoustic resonator may include the stiffener layer and the TFT layer or the semiconductor layer. The acoustic resonator may be configured to cause a first local maximum of ultrasonic wave transmission.

According to some examples, the ultrasonic fingerprint sensor system may include a thin film transistor (TFT) layer, a piezoelectric layer and a backing layer. In some examples, an acoustic resonator may include the TFT layer, the piezoelectric layer and the backing layer. The acoustic resonator may be configured to cause a first local maximum of ultrasonic wave transmission.

In some examples, the display stack may include one or more display stack layers in which a sound speed is above a sound speed threshold. The one or more display stack layers each may have a thickness that is less than one-fifth of a wavelength corresponding to the peak frequency. According to some examples, the sound speed threshold may be in a range from 2000-2500 meters per second.

According to some examples, the apparatus may include a control system configured for communication with the ultrasonic fingerprint sensor system and the display system. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. In some implementations, a mobile device (such as a wearable device, a cellular telephone, etc.) may be, or may include, at least part of the apparatus.

According to some examples, the control system may be configured to control the ultrasonic fingerprint sensor system to obtain ultrasonic image data from one or more objects in contact with an outer surface of the foldable display device and to perform an authentication process that is based, at least in part, on the ultrasonic image data. In some examples, the one or more objects may include one or more digits and the authentication process may be a fingerprint-based authentication process.

According to some examples, a foldable display device may include an ultrasonic fingerprint sensor system configured to operate in a near-field mode having a peak frequency in a range from 1 megahertz (MHz) to 6 MHz. The ultrasonic fingerprint sensor system may include an ultrasonic fingerprint sensor system stack. In some examples, the foldable display device may include a stiffener layer residing between the display stack and the ultrasonic fingerprint sensor system stack. The stiffener layer may have a stiffener layer thickness that is less than one-fifth of a wavelength corresponding to the peak frequency. According to some examples, the display stack may include one or more display stack layers in which a sound speed is above a sound speed threshold. In some examples, the sound speed threshold may be in a range from 2000 to 2500 meters per second. The one or more display stack layers may each have a thickness that is less than one-fifth of a wavelength corresponding to the peak frequency.

In some examples, the stiffener layer thickness may correspond with a transmission coefficient in a range from 10 percent to 30 percent for ultrasonic waves in the range from 3 MHz to 6 MHz. According to some examples, operation of the ultrasonic fingerprint sensor system in the near-field mode may provide a resolution of at least 3 line pairs per millimeter.

According to some examples, the stiffener layer may include stainless steel, titanium, aluminum, carbon fiber reinforced polymer (CFRP), glass fiber reinforced polymer (GFRP), or combinations thereof. In some examples, the stiffener layer may include a stainless steel layer, a titanium layer, a CFRP layer or a GFRP layer having a thickness in a range from 30 microns to 200 microns, or an aluminum layer having a thickness in a range from 100-300 microns.

In some examples, the apparatus may include an adhesive layer residing on a side of the stiffener layer proximate the display stack. In some such examples, the adhesive layer may have a thickness of less than 100 microns.

According to some examples, the apparatus may include a display cover layer residing between the display stack and an outer surface of the foldable display device. In some examples, the display cover layer may be, or may include, glass, transparent plastic, or a combination thereof. According to some examples, a first acoustic resonator may include the stiffener layer, the display stack and the display cover layer. The first acoustic resonator may be configured to cause a first local maximum of ultrasonic wave transmission.

In some examples, the first acoustic resonator may include at least one first-resonator flexible optically clear adhesive (OCA) layer. According to some examples, the at least one first-resonator flexible OCA layer may have a thickness that is substantially an odd or even multiple of one eighth of a wavelength corresponding to ultrasonic waves in the range from 1 MHz to 14 MHz, where substantially indicates being within plus or minus 10 percent. In some such examples, the one or more layers may include a second-resonator flexible optically clear adhesive (OCA) layer having a thickness corresponding to an odd multiple of one eighth of a wavelength corresponding to ultrasonic waves in the range from 1 MHz to 14 MHz plus or minus 10 percent.

Other innovative aspects of the subject matter described in this disclosure may be implemented in a method. In some examples, the method may involve controlling, by a control system, an ultrasonic fingerprint sensor system to operate in a near-field mode having a peak frequency in a range from 1 megahertz (MHz) to 6 MHz. According to some examples, the method may involve controlling, by the control system, the ultrasonic fingerprint sensor system to obtain ultrasonic image data from one or more objects in contact with an outer surface of an apparatus that includes the ultrasonic fingerprint sensor system. In some examples, the method may involve performing, by the control system, an authentication process that is based, at least in part, on the ultrasonic image data.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in one or more non-transitory media having software stored thereon.

For example, the software may include instructions for controlling one or more devices to perform a method. According to some examples, the method may involve controlling, by a control system, an ultrasonic fingerprint sensor system to operate in a near-field mode having a peak frequency in a range from 1 megahertz (MHz) to 6 MHz. According to some examples, the method may involve controlling, by the control system, the ultrasonic fingerprint sensor system to obtain ultrasonic image data from one or more objects in contact with an outer surface of an apparatus that includes the ultrasonic fingerprint sensor system. In some examples, the method may involve performing, by the control system, an authentication process that is based, at least in part, on the ultrasonic image data.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings indicate like elements.

DETAILED DESCRIPTION

Figure 1:
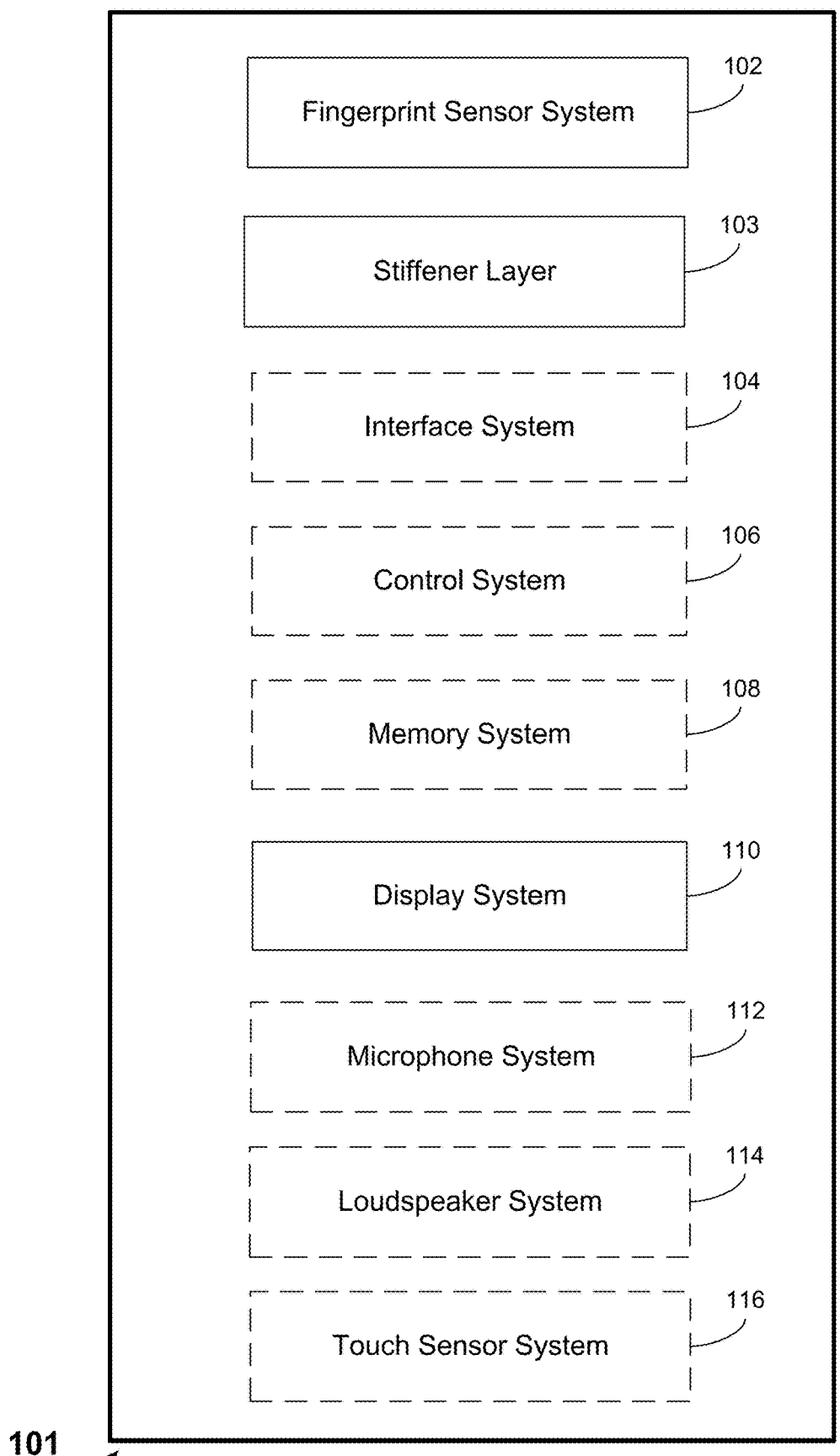
FIG. 1 is a block diagram that shows example components of an apparatus according to some disclosed implementations.

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a biometric system as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, steering wheels or other automobile parts, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Many devices, including but not limited to mobile devices such as cellular telephones, are configured to implement fingerprint-based authentication using an ultrasonic fingerprint sensor system. In many modern devices, a display stack may reside between an active area of the ultrasonic fingerprint sensor system and an outer surface of the device on which a user will place a finger for an authentication attempt. The active area may, for example, be an area in which an array of ultrasonic fingerprint sensor pixels (such as receiver pixels) resides.

It has proven to be challenging to provide foldable display devices having this "under-display" configuration. One challenge is caused by the stiffener layer that resides between the display stack and the ultrasonic sensor system stack in a foldable display device. In some instances, the stiffener layer may reduce the energy of transmitted ultrasonic waves by about 75%, as compared to the energy transmitted through overlying layers of display devices that lack a stiffener layer. Generally speaking, the energy of transmitted ultrasonic waves that traverse the display stack becomes relatively lower at relatively higher frequencies, such as frequencies in the 8 megahertz (MHz) to 12 MHz range that are known to provide an acceptable resolution for ultrasonic fingerprint imaging. Lower ultrasonic frequencies of longitudinal and shear waves, such as longitudinal and shear waves having ultrasonic frequencies in the 1 MHz to 6 MHz range, have higher transmission energies but have been shown to provide unacceptable resolution for fingerprint imaging.

Some disclosed devices provide an ultrasonic sensor system that is configured to operate in a near-field mode having a peak frequency for transmitted ultrasonic waves that is in a range from 1 megahertz (MHz) to 6 MHz. In some such examples, operation of the ultrasonic sensor system in the near-field mode provides a resolution of at least 3 line pairs per millimeter (LPMM). According to some examples, a foldable display device may include a stiffener layer residing between a display stack and an ultrasonic sensor system stack. The stiffener layer may have a thickness that is selected to allow the ultrasonic sensor system to operate in the near-field mode. The stiffener layer thickness may be less than one-fifth of a wavelength corresponding to the peak frequency.

Particular aspects of the subject matter described in this disclosure may be implemented to realize one or more of the following potential advantages. Some disclosed foldable display device implementations configured for ultrasonic sensor system operation in the near-field mode can provide improved ultrasonic energy transmission as compared to that provided by ultrasonic sensor systems of previously-deployed foldable display devices. Alternatively, or additionally, some disclosed foldable display device implementations configured for ultrasonic sensor system operation in the near-field mode can provide a higher resolution for ultrasonic image data obtained from ultrasonic wave transmissions having a peak frequency in the range from 1 MHz to 6 MHz, as compared to that provided by previously-deployed foldable display devices.

FIG. 1 is a block diagram that shows example components of an apparatus according to some disclosed implementations. In this example, the apparatus 101 includes a fingerprint sensor system 102, a stiffener layer 103 and a display system 110. Some implementations may include an interface system 104, a memory system 108, control system 106, a microphone system 112, a loudspeaker system 114, a touch sensor system 116, or combinations thereof. In some examples, the apparatus 101 may be a foldable display device. As with other disclosed examples, alternative implementations of the apparatus 101 may include different numbers of elements, different types of elements, or combinations thereof.

In this example, the fingerprint sensor system 102 is, or includes, an ultrasonic fingerprint sensor system. In some implementations the fingerprint sensor system 102 also may include another type of fingerprint sensor, such as an optical fingerprint sensor, a capacitive fingerprint sensor, a thermal fingerprint sensor, etc. In some examples, the ultrasonic fingerprint sensor system may include an ultrasonic receiver and a separate ultrasonic transmitter. In some such examples, the ultrasonic transmitter may include an ultrasonic plane-wave generator. However, various examples of ultrasonic fingerprint sensors are disclosed herein, some of which may include a separate ultrasonic transmitter and some of which may not. For example, in some implementations, the fingerprint sensor system 102 may include a piezoelectric receiver layer, such as a layer of polyvinylidene fluoride PVDF polymer or a layer of polyvinylidene fluoride-trifluoroethylene (PVDF-TrFE) copolymer. In some implementations, a separate piezoelectric layer may serve as the ultrasonic transmitter. In some implementations, a single piezoelectric layer may serve as both a transmitter and a receiver. The fingerprint sensor system 102 may, in some examples, include an array of ultrasonic transducer elements, such as an array of piezoelectric micromachined ultrasonic transducers (PMUTs), an array of capacitive micromachined ultrasonic transducers (CMUTs), etc. In some such examples, PMUT elements in a single-layer array of PMUTs or CMUT elements in a single-layer array of CMUTs may be used as ultrasonic transmitters as well as ultrasonic receivers.

Data received from the fingerprint sensor system 102 may sometimes be referred to herein as "fingerprint sensor data," "ultrasonic fingerprint sensor data," "fingerprint image data," "ultrasonic image data," etc., whether or not the received data corresponds to an actual digit or another object from which the fingerprint sensor system 102 has received data. Such data will generally be received from the fingerprint sensor system in the form of electrical signals. Accordingly, without additional processing such image data would not necessarily be perceivable by a human being as an image. As noted elsewhere herein, the word "finger" as used herein may correspond to any digit, including a thumb. Accordingly, a thumbprint is a type of fingerprint.

In the example shown in FIG. 1, the apparatus 101 includes a stiffener layer 103. In some examples, the stiffener layer 103 may reside between an active area of the fingerprint sensor system 102 (for example, an area in which an array of ultrasonic sensor pixels, such as an array of ultrasonic receiver pixels, resides) and a display stack of the display system 110. Various types and thicknesses of stiffener layers 103 are disclosed herein. In some examples, the stiffener layer 103 may include stainless steel, titanium, aluminum, carbon fiber reinforced polymer (CFRP), glass fiber reinforced polymer (GFRP), or combinations thereof. According to some examples, the stiffener layer 103 may be, or may include, a stainless steel layer, a titanium layer, a CFRP layer or a GFRP layer having a thickness in a range from 30 microns to 200 microns. In some examples, the stiffener layer 103 may be, or may include, an aluminum layer having a thickness in a range from 100-300 microns. According to some examples, the stiffener layer 103 may have a thickness that is less than one-fifth of a wavelength corresponding to a peak frequency of ultrasonic waves transmitted by the fingerprint sensor system 102, thereby allowing the fingerprint sensor system 102 to operate in a near-field mode. The peak frequency of ultrasonic waves transmitted in the near-field mode may, in some examples, be in a range from 1 MHz to 6 MHz.

In some examples, the interface system 104 may include a wireless interface system. In some implementations, the interface system 104 may include a user interface system, one or more network interfaces, one or more interfaces between the control system 106 and the fingerprint sensor system 102, one or more interfaces between the control system 106 and the touch sensor system 116, one or more interfaces between the control system 106 and the memory system 108, one or more interfaces between the control system 106 and the display system 110, one or more interfaces between the control system 106 and the microphone system 112, one or more interfaces between the control system 106 and the loudspeaker system 114, one or more interfaces between the control system 106 and the gesture sensor system 116 and/or one or more interfaces between the control system 106 and one or more external device interfaces (e.g., ports or applications processors).

The interface system 104 may be configured to provide communication (which may include wired or wireless communication, electrical communication, radio communication, etc.) between components of the apparatus 101. In some such examples, the interface system 104 may be configured to provide communication between the control system 106 and the fingerprint sensor system 102. According to some such examples, the interface system 104 may couple at least a portion of the control system 106 to the fingerprint sensor system 102 and the interface system 104 may couple at least a portion of the control system 106 to the touch sensor system 116, e.g., via electrically conducting material (e.g., via conductive metal wires or traces. According to some examples, the interface system 104 may be configured to provide communication between the apparatus 101 and other devices and/or human beings. In some such examples, the display system 110, the microphone system 112, the loudspeaker system 114, the gesture sensor system 116, or combinations thereof may be considered to be components of the interface system 104, even though these components are shown as separate blocks in FIG. 1. In some examples, the interface system 104 may include one or more user interfaces, haptic feedback devices, etc. The interface system 104 may, in some examples, include one or more network interfaces and/or one or more external device interfaces (such as one or more universal serial bus (USB) interfaces or a serial peripheral interface (SPI)).

The control system 106 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. According to some examples, the control system 106 also may include one or more memory devices, such as one or more random access memory (RAM) devices, read-only memory (ROM) devices, etc. In this example, the control system 106 is configured for communication with, and for controlling, the fingerprint sensor system 102. In implementations wherein the apparatus includes a touch sensor system 116, the control system 106 may be configured for communication with, and for controlling, the touch sensor system 116. In implementations wherein the apparatus includes a memory system 108 that is separate from the control system 106, the control system 106 also may be configured for communication with the memory system 108. In implementations wherein the apparatus includes a display system 110, the control system 106 may be configured for communication with, and for controlling, the display system 110. In implementations wherein the apparatus includes a microphone system 112, the control system 106 may be configured for communication with, and for controlling, the microphone system 112. In implementations wherein the apparatus includes an loudspeaker system 114, the control system 106 may be configured for communication with, and for controlling, the loudspeaker system 114. According to some examples, the control system 106 may include one or more dedicated components that are configured for controlling the fingerprint sensor system 102, the touch sensor system 116, the memory system 108, the display system 110, the microphone system 112 and/or the loudspeaker system 114.

Accordingly, some examples of the apparatus 101 may include dedicated components that are configured for controlling at least a portion of the fingerprint sensor system 102, for processing fingerprint image data received from the fingerprint sensor system 102, or combinations thereof.

Although the control system 106 and the fingerprint sensor system 102 are shown as separate components in FIG. 1, in some implementations at least a portion of the control system 106 and at least a portion of the fingerprint sensor system 102 may be co-located. For example, in some implementations one or more components of the fingerprint sensor system 102 may reside on an integrated circuit or "chip" of the control system 106. According to some implementations, functionality of the control system 106 may be partitioned between one or more controllers or processors, such as between a dedicated sensor controller and an applications processor (also referred to herein as a "host" processor) of an apparatus, such as a host processor of a mobile device. In some such implementations, at least a portion of the host processor may be configured for fingerprint image data processing, determination of whether currently-acquired fingerprint image data matches previously-obtained fingerprint image data (such as fingerprint image data obtained during an enrollment process), etc.

In some examples, the control system 106 may be configured to control the ultrasonic sensor system 102 to obtain ultrasonic image data from one or more objects in contact with an outer surface of the apparatus 101. In some such examples, the control system 106 may be configured to perform an authentication process that is based, at least in part, on the ultrasonic image data. According to some examples, the one or more objects may include one or more digits and the authentication process may be a fingerprint-based authentication process.

In some examples, the memory system 108 may include one or more memory devices, such as one or more RAM devices, ROM devices, etc. In some implementations, the memory system 108 may include one or more computer-readable media, storage media and/or storage media. Computer-readable media include both computer storage media and communication media including any medium that may be enabled to transfer a computer program from one place to another. Storage media may be any available media that may be accessed by a computer. In some examples, the memory system 108 may include one or more non-transitory media. By way of example, and not limitation, non-transitory media may include RAM, ROM, electrically erasable programmable read-only memory (EEPROM), compact disc ROM (CD-ROM) or other optical disk storage, magnetic disk storage or other magnetic storage devices, or any other medium that may be used to store desired program code in the form of instructions or data structures and that may be accessed by a computer.

In this example, the apparatus 101 includes a display system 110, which may include one or more displays. In some examples, the display system 110 may be, or may include, a light-emitting diode (LED) display, such as an organic light-emitting diode (OLED) display. In some examples, the display system 110 may be, or may include, a color filter on encapsulation (COE) display. According to this example, the display system 110 includes layers, which may be referred to collectively as a "display stack." In some examples, the display stack may include one or more display stack layers in which the sound speed is above a sound speed threshold. In some such examples, the one or more display stack layers in which the sound speed is above a sound speed threshold may each have a thickness that is less than one-fifth of a wavelength corresponding to a peak frequency of ultrasound transmitted by the fingerprint sensor system 102.

In some implementations, the apparatus 101 may include a microphone system 112. The microphone system 112 may include one or more microphones, one or more types of microphones, or combinations thereof.

According to some implementations, the apparatus 101 may include an loudspeaker system 114. The loudspeaker system 114 may include one or more loudspeakers, one or more types of loudspeakers, or combinations thereof.

The optional touch sensor system 116 may be, or may include, a resistive touch sensor system, a surface capacitive touch sensor system, a projected capacitive touch sensor system, a surface acoustic wave touch sensor system, an infrared touch sensor system, or any other suitable type of touch sensor system. In some implementations, the area of the touch sensor system 116 may extend over most or all of a display portion of the display system 110.

The apparatus 101 may be used in a variety of different contexts, some examples of which are disclosed herein. For example, in some implementations a mobile device may include at least a portion of the apparatus 101. According to some implementations, the apparatus 101 may be, or may include, a foldable display device, such as a foldable cell phone. In some implementations, a wearable device may include at least a portion of the apparatus 101. The wearable device may, for example, be a bracelet, a watch, an armband, a wristband, a ring, a headband, an earbud or a patch. In some implementations, the control system 106 may reside in more than one device. For example, a portion of the control system 106 may reside in a wearable device and another portion of the control system 106 may reside in another device, such as a mobile device (e.g., a smartphone). The interface system 104 also may, in some such examples, reside in more than one device.

Figure 2:
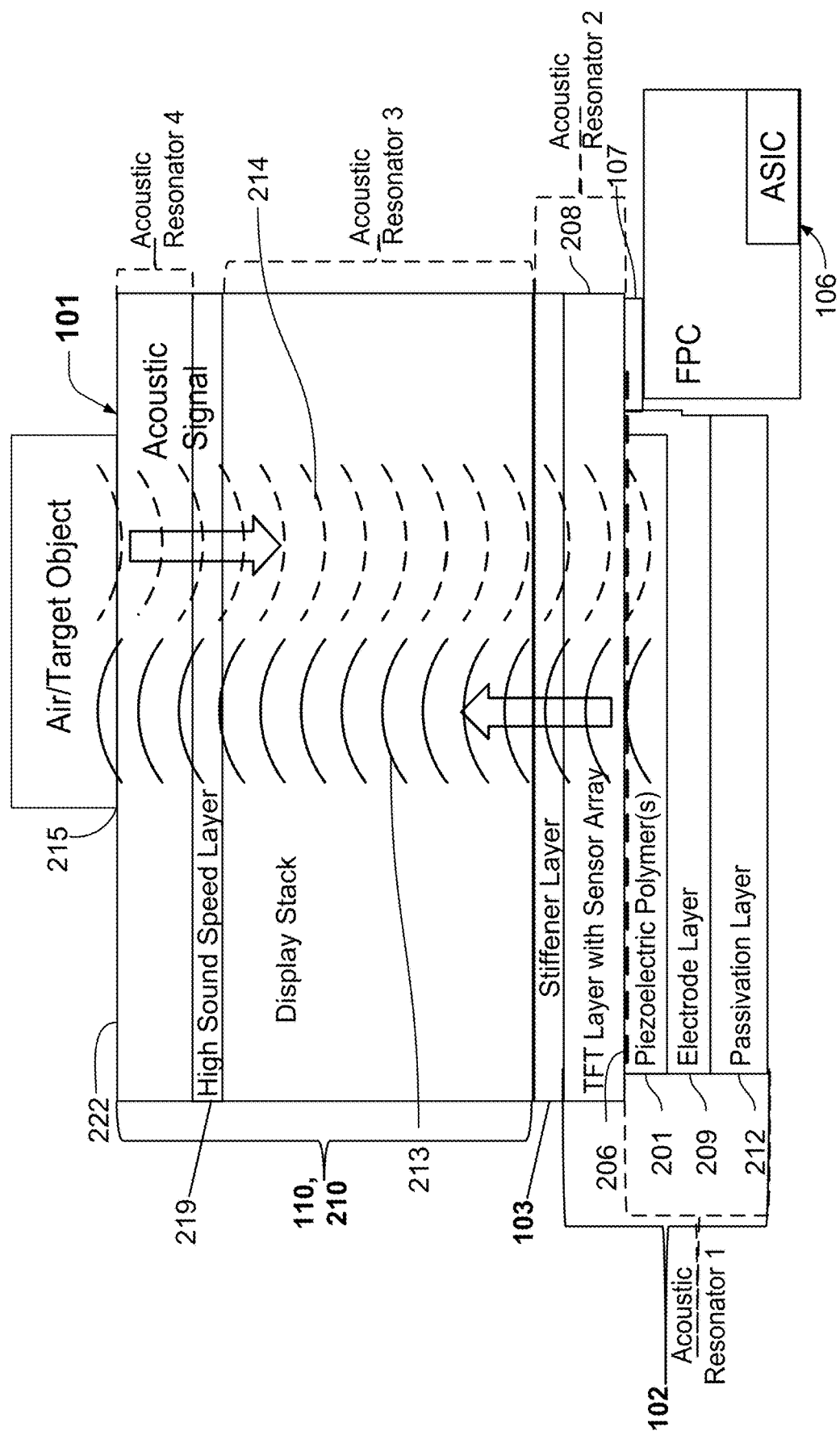
FIG. 2 shows example components of an apparatus according to some disclosed implementations.

FIG. 2 shows example components of an apparatus according to some disclosed implementations. As with other disclosed implementations, the types, number and arrangement of elements, as well as the dimensions of elements, are merely examples. According to this example, the apparatus 101 is configured to perform at least some of the methods disclosed herein. In this implementation, the apparatus 101 includes a fingerprint sensor system 102, a stiffener layer 103 and a display system 110.

In this implementation, the fingerprint sensor system 102 is an ultrasonic fingerprint sensor system. Accordingly, the fingerprint sensor system 102 may be referred to as an ultrasonic fingerprint sensor system 102. In this implementation, the ultrasonic fingerprint sensor system 102 includes a ultrasonic transceiver layer 201, an electrode layer 209 on one side of the ultrasonic transceiver layer 201, an array of sensor pixels 206 on a second and opposing side of the ultrasonic transceiver layer 201, and a TFT layer 208. In this implementation, the ultrasonic transceiver layer 201 includes one or more piezoelectric polymers. In other implementations, the ultrasonic transceiver layer 201 may include one or more other types of piezoelectric materials, such as a piezoelectric composite.

According to this example, the electrode layer 209 resides between a passivation layer 212 and the ultrasonic transceiver layer 201. According to some examples, the electrode layer 209 may include a metallic ink, such as a silver ink. In some examples, the passivation layer 212 may include an adhesive, such as an epoxy film, a die attach film (DAF) layer, a polymer layer (such as a polyethylene terephthalate (PET) layer), etc.

In this example, the TFT layer 208 includes a TFT substrate and circuitry for the array of sensor pixels 206. The TFT layer 208 may be a type of metal-oxide-semiconductor field-effect transistor (MOSFET) made by depositing thin films of an active semiconductor layer as well as a dielectric layer and metallic contacts over a TFT substrate. In some examples, the TFT substrate may be a non-conductive material such as glass. In some alternative examples, the apparatus 101 may include a semiconductor layer instead of the TFT layer 208.

In some examples, the stiffener layer 103 may include stainless steel, titanium, aluminum, carbon fiber reinforced polymer (CFRP), glass fiber reinforced polymer (GFRP), or combinations thereof. According to some examples, the stiffener layer 103 may be, or may include, a stainless steel layer, a titanium layer, a CFRP layer or a GFRP layer having a thickness in a range from 50 microns to 200 microns. In some examples, the stiffener layer 103 may be, or may include, an aluminum layer having a thickness in a range from 100-300 microns. According to some examples, the stiffener layer 103 may have a thickness that is less than one-fifth of a wavelength corresponding to a peak frequency of ultrasonic waves transmitted by the ultrasonic fingerprint sensor system 102, thereby allowing the fingerprint sensor system 102 to operate in a near-field mode. The peak frequency of ultrasonic waves transmitted while operating in the near-field mode may, in some examples, be in a range from 1 MHz to 6 MHz, such as 1 MHz, 2 MHz, 3 MHz, 4 MHz, 5 MHz, 6 MHz, or another peak frequency in this range. In some examples, operation of the ultrasonic fingerprint sensor system 102 in a near-field mode may provide a resolution of at least 3 line pairs per millimeter (LPMM). According to some examples, the resolution may be greater than 3 LPMM, such as 3.1 LPMM, 3.2 LPMM, 3.3 LPMM, 3.4 LPMM, 3.5 LPMM, etc.

According to this example, the display system 110 includes multiple layers, which are collectively referred to as a display stack 210. In this example, the display stack 210 includes a high sound speed layer 219. The speed of sound in the high sound speed layer 219 is relatively higher than the speed of sound in other layers of the display stack 210. In some examples, the high sound speed layer 219 may be, or may include, a glass layer. The high sound speed layer 219 may also be referred to herein as a "display glass layer," although the "display glass layer" may, in some examples, include a material other than glass (such as a hard plastic material). Sound travels at different speeds in various types of glass, ranging from approximately 2000 meters/second (m/s) to 6000 m/s. According to some examples, the speed of sound in the high sound speed layer 219 may be above a sound speed threshold, which may be 2000 m/s, 2500 m/s, 3000 m/s, etc. In some examples, the sound speed threshold may be in a range from 2000 m/s to 2500 m/s, such as 2000 m/s, 2100 m/s, 2200 m/s, 2300 m/s, 2400 m/s, 2500 m/s, etc. In some examples, in other layers of the display stack 210 sound may travel at relatively lower speeds than the speed of sound in the high sound speed layer 219. Such other layers of the display stack 210 may, for example, include one or more types of optically clear adhesive (OCA), pressure-sensitive adhesive (PSA), polyethylene terephthalate (PET), etc. However, in some implementations the display stack 210 may include more than one high sound speed layer 219. In some implementations, the acoustic impedance of the high sound speed layer 219 may also be higher than that of most or all other layers in the display stack 210.

According to some examples, both the high sound speed layer(s) 219 and the stiffener layer 103 have a thickness that is less than one-fifth of a wavelength corresponding to the peak frequency of ultrasound transmitted by the ultrasonic fingerprint sensor system 102. In some such examples, the ultrasonic fingerprint sensor system 102 may operate in a near field mode. In some such examples, the peak frequency of ultrasonic waves transmitted during operation in the near-field mode may be in the range from 1 MHz to 6 MHz.

According to this example, acoustic resonator 1 includes the ultrasonic transceiver layer 201, the electrode layer 209 and the passivation layer 212, and is bounded on one side by the TFT layer 208 (or the semiconductor layer, depending on the particular implementation). Acoustic resonator 1 may be configured to cause a local maximum of ultrasonic wave transmission. In some such examples, acoustic resonator 2 may have a thickness corresponding to a multiple of a quarter wavelength at a frequency in the range from 1 MHz-15 MHz. The multiple may be 1, 2, 3, or another integer.

In this example, the stiffener layer 103 resides between the ultrasonic fingerprint sensor system 102 and the display stack 210. Although not shown in FIG. 2, in some examples, one or more layers may reside between the TFT layer 208 and the stiffener layer 103 (or between a semiconductor layer and the stiffener layer 103). The one or more layers may include an adhesive layer, a double-sided adhesive tape (DST) layer, etc.

In the example shown in FIG. 2, acoustic resonator 2 includes the stiffener layer 103 and the TFT layer 208 (or the stiffener layer 103 and the semiconductor layer, depending on the particular implementation). Acoustic resonator 2 may be configured to cause a local maximum of ultrasonic wave transmission. In some such examples, acoustic resonator 2 may have a thickness corresponding to a multiple of a half wavelength at a frequency in the range from 1 MHz-15 MHz.

According to this example, acoustic resonator 3 is bounded by the stiffener layer 103 and the high sound speed layer 219, and includes layers of the display stack 210 that reside between the stiffener layer 103 and the high sound speed layer 219. Acoustic resonator 3 may be configured to cause a local maximum of ultrasonic wave transmission. In some such examples, acoustic resonator 3 may have a thickness corresponding to a multiple of a half wavelength at a frequency in the range from 1 MHz-15 MHz.

In this example, acoustic resonator 4 is bounded by the high sound speed layer 219 and the outer surface 222 of the apparatus 101. The acoustic resonator 4 includes one or more layers of the display stack 210 that reside between the high sound speed layer 219 and the outer surface 222. In some examples, the one or more layers may, for example, include at least one flexible optically clear adhesive (OCA) layer. In some such examples, the flexible OCA layer may have a thickness in the range from 5 microns to 180 microns. Acoustic resonator 4 may be configured to cause a local maximum of ultrasonic wave transmission. In some such examples, acoustic resonator 4 may have a thickness corresponding to a multiple of a quarter wavelength at a frequency in the range from 1 MHz-15 MHz.

According to this implementation, the TFT layer 208, the array of sensor pixels 206 and the electrode layer 209 are electrically coupled to at least a portion of the control system 106 and one side of the ultrasonic transceiver layer 201 via a portion of the interface system 104, which includes electrically conducting material and a flexible printed circuit (FPC) in this instance.

In this example, the apparatus 101 is configured to perform at least some of the methods disclosed herein. In this example, the control system 106 is configured to control the ultrasonic sensor system to transmit the ultrasonic waves 213. In some examples, the control system 106 may include one or more other components in addition to the application-specific integrated circuit (ASIC) that is shown in FIG. 2.

According to this example, the ultrasonic waves 213 are transmitted through the TFT layer 208, the stiffener layer 103 and the layers of the display stack 210. According to this example, reflections 214 of the ultrasonic waves 213 are caused by acoustic impedance contrast at (or near) the interface 215 between the outer surface 222 and whatever is in contact with the outer surface 222, which may be air or the surface of a target object, such as the ridges and valleys of a fingerprint, etc. (As used herein, the term "finger" may refer to any digit, including a thumb. Accordingly, a thumbprint will be considered a type of "fingerprint.")

According to some examples, reflections 214 of the ultrasonic wave(s) 213 from air, the target object, or combinations thereof, may be detected by the array of sensor pixels 206. Corresponding ultrasonic signals may be provided to the control system 106. In some such implementations, ultrasonic signals that are used by the control system 106 for fingerprint-based authentication may be based on reflections 214 from the target object that are detected by the array of sensor pixels 206. In some implementations, reflections 214 corresponding to an outer surface 222/air interface may be detected by the array of sensor pixels 206 and corresponding background ultrasonic signals may be provided to the control system 106.

Figure 3:
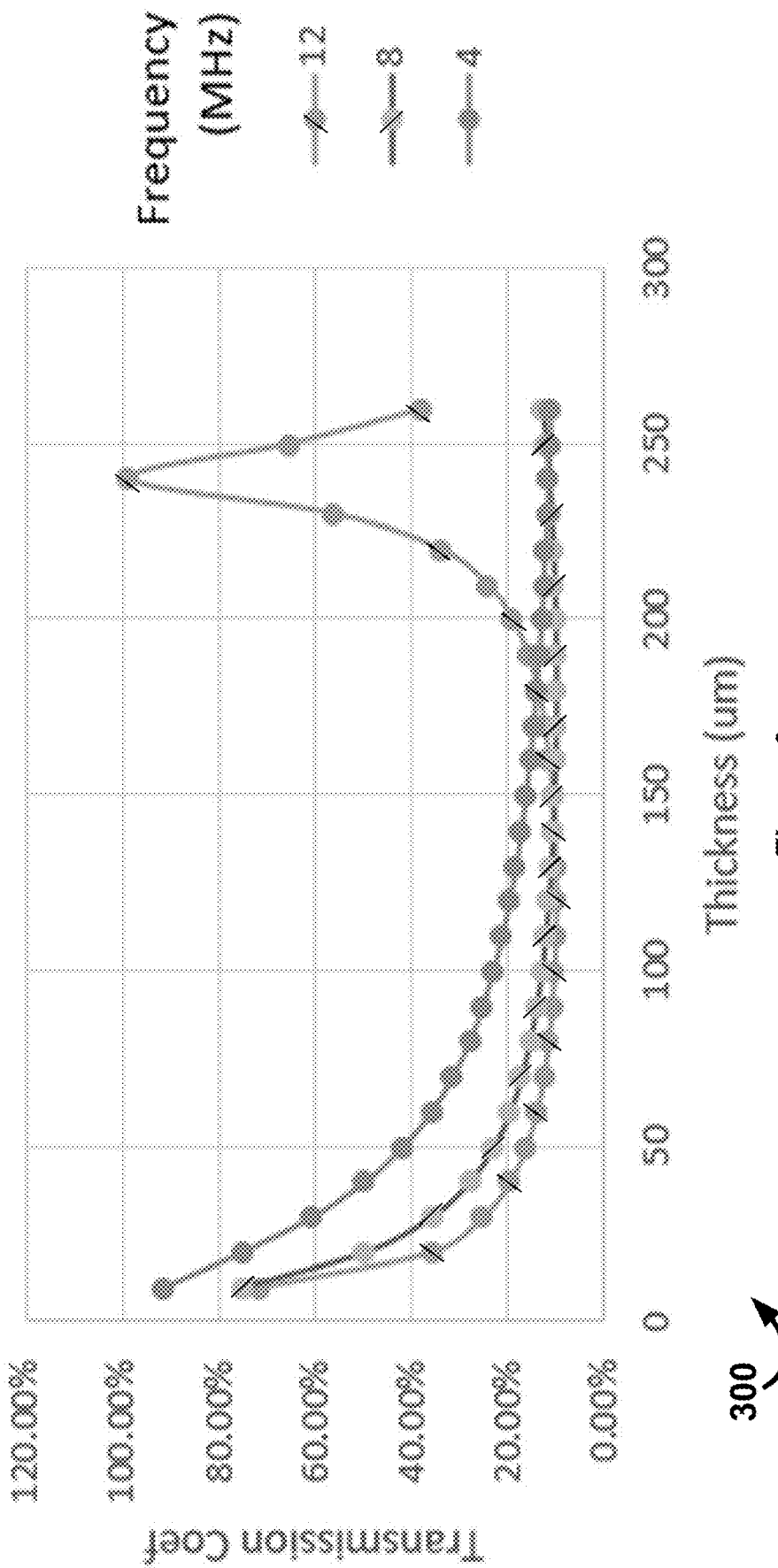
FIG. 3 is a graph that shows examples of how the transmission coefficient for ultrasonic waves in stainless steel (SUS) changes according to SUS thickness and the peak frequency of the ultrasonic waves.

FIG. 3 is a graph that shows examples of how the transmission coefficient for ultrasonic waves in stainless steel (SUS) changes according to SUS thickness and the peak frequency of the ultrasonic waves. With reference to the graph 300, one may observe that, in general, the transmission coefficient decreases with increasing SUS thickness. One exception is the local maximum for 12 MHz ultrasonic waves that occurs at 240 microns, which is caused by the SUS layer acting as an acoustic resonator for 12 MHz ultrasonic waves at this thickness. However, the transmission coefficient otherwise decreases with increasing SUS thickness in a SUS thickness range of interest, such as 30-250 microns.

One may also observe that the transmission coefficient decreases more quickly with increasing SUS thickness at higher frequencies. For example, at an SUS thickness of approximately 40 microns, the transmission coefficient of SUS for 12 MHz ultrasonic waves is approximately 20%, whereas for the same SUS thickness the transmission coefficient for 4 MHz ultrasonic waves is approximately 50%. The transmission coefficient for 4 MHz ultrasonic waves is approximately 20% for an SUS thickness of approximately 120 microns and is greater than 20% for smaller thicknesses. The transmission coefficient for 4 MHz ultrasonic waves ranges from approximately 10% to 30% for SUS thicknesses ranging from approximately 260 microns to 75 microns.

In summary, one may observe from graph 300 that— except for thicknesses corresponding to resonance—the transmission coefficient for SUS increases with decreasing SUS thickness, but increases relatively more quickly for relatively lower frequencies. Accordingly, if the stiffener layer 103 is made of SUS, one may increase the amount of ultrasonic energy available for fingerprint images by reducing the thickness of the stiffener layer 103, by reducing the peak frequency of transmitted ultrasonic waves, or both. The present inventors have found that the same principles apply to other materials used to form the stiffener layer 103, such as titanium, aluminum, carbon fiber reinforced polymer (CFRP), glass fiber reinforced polymer (GFRP), etc.

Figure 4:
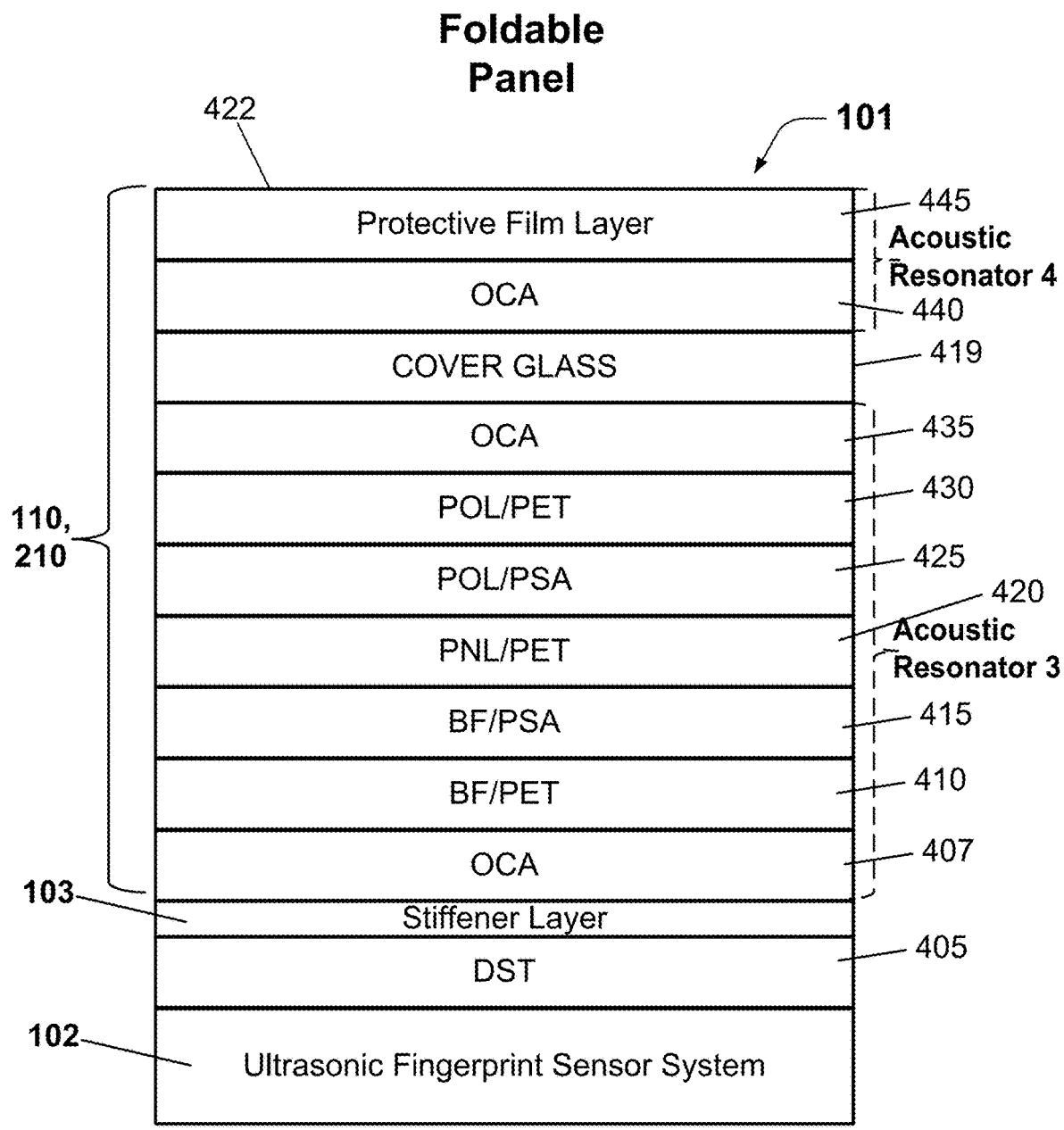
FIG. 4 shows example components of an apparatus according to some disclosed implementations.

FIG. 4 shows example components of an apparatus according to some disclosed implementations. As with other disclosed implementations, the types, number and arrangement of elements, as well as the dimensions of elements, are merely examples. Please note that FIG. 4 is not drawn to scale and therefore the relative thicknesses of the layers shown in FIG. 4 may not be accurate. In this example, the apparatus 101 is, or includes, a foldable display device, not all of which is shown in FIG. 4. According to this example, the apparatus 101 is configured to perform at least some of the methods disclosed herein. In this implementation, the apparatus 101 includes an ultrasonic fingerprint sensor system 102, a stiffener layer 103 and a display system 110.

In some examples, the stiffener layer 103 may include stainless steel, titanium, aluminum, carbon fiber reinforced polymer (CFRP), glass fiber reinforced polymer (GFRP), or combinations thereof. According to some examples, the stiffener layer 103 may be, or may include, a stainless steel layer, a titanium layer, a CFRP layer or a GFRP layer having a thickness in a range from 50 microns to 200 microns. In some examples, the stiffener layer 103 may be, or may include, an aluminum layer having a thickness in a range from 100-300 microns. According to some examples, the stiffener layer 103 may have a thickness that is less than one-fifth of a wavelength corresponding to a peak frequency of ultrasonic waves transmitted by the ultrasonic fingerprint sensor system 102, thereby allowing the ultrasonic fingerprint sensor system 102 to operate in a near-field mode. The peak frequency may, in some examples, be in a range from 1 MHz to 6 MHz. In some examples, operation of the ultrasonic fingerprint sensor system 102 in a near-field mode may provide a resolution of at least 3 line pairs per millimeter.

According to this example, the display system 110 includes multiple layers, which are collectively referred to as a display stack 210. In this example, the display stack 210 includes a cover glass layer 419, which is an instance of the high sound speed layer 219 that is described herein with reference to FIG. 2. As noted in that description, the display glass layer 219 may, in some examples, include glass or be formed entirely of glass. However, the display glass layer 219 may, in some examples, include a material other than glass (such as a hard plastic material, for example polyethylene terephthalate (PET)).

According to some examples, both the display glass layer 419 and the stiffener layer 103 have a thickness that is less than one-fifth of a wavelength corresponding to the peak frequency of ultrasound transmitted by the ultrasonic fingerprint sensor system 102. In some such examples, the ultrasonic fingerprint sensor system 102 may operate in a near field mode. In some such examples, the peak frequency may be in the range from 1 MHz to 6 MHz.

In this example, the stiffener layer 103 resides between the ultrasonic fingerprint sensor system 102 and the display stack 210. According to this example, a double-sided adhesive tape (DST) layer 405 resides between the ultrasonic fingerprint sensor system 102 and the stiffener layer 103.

Acoustic resonator 3 may be configured to cause a local maximum of ultrasonic wave transmission. In some such examples, acoustic resonator 3 may have a thickness corresponding to a multiple of a half wavelength at a frequency in the range from 1 MHz-15 MHz.

According to this example, acoustic resonator 3 is bounded by the stiffener layer 103 and the display glass layer 419, and includes layers of the display stack 210 that reside between the stiffener layer 103 and the display glass layer 419. In this example, these layers include an optically clear adhesive layer (OCA) 407 residing between the stiffener layer 103 and two backplate film (BF) layers, one of which is a polyethylene terephthalate (PET) backplate film (BF/ PET) layer 410 and the other of which is a pressure-sensitive adhesive backplate film (BF/PSA) layer 415. According to this example, a PET display panel layer (PNL/PET) layer 420 resides between the BF layers and two polarizer (POL) layers: a PET polarizer layer (POL/PET) layer 430 is attached to the display panel layer by a PSA polarizer layer (POL/PSA) layer 425. In this example, the cover glass layer 419 is attached to the POL/PET layer by the OCA layer 435. In some embodiments, one or both of the OCA layers 407 and 435 may be, or may include, a flexible OCA layer. According to some examples, one or both of the OCA layers 407 and 435 may be, or may include, an OCA provided by 3M™, such as the 3M™ Contrast Enhancement Film CEF30XXAS Series. In some such examples, the flexible OCA layer may have material properties that change significantly with temperature. One such flexible OCA material has a speed of sound for longitudinal waves that is approximately 2184 meters/second (m/s) at −4.7 degrees Celsius, but is only approximately 1719 m/s at 38.7 degrees Celsius. The same type of flexible OCA material has a Young's modulus of approximately 1668 at −4.7 degrees Celsius, but only approximately 1190 at 38.7 degrees Celsius. In some such examples, one or both of the OCA layers 407 and 435 may have a thickness that is an odd multiple of 25 microns, or is substantially an odd multiple of 25 microns (such as 25 microns, 75 microns, 125 microns, etc.). In this context, "substantially" may mean within plus or minus 10%. Such embodiments may enhance a 5 MHz mode of resonance. However, according to some alternative examples, one or both of the OCA layers 407 and 435 may have a thickness that is an even multiple of 35 microns, or substantially an even multiple of 35 microns (such as 70 microns, 140 microns, etc.). In this context, "substantially" may mean within plus or minus 10%. Such embodiments may enhance a mode of resonance that is in the range of 6 MHz to 7 MHz. More generally, in some examples, acoustic resonator 3 may include at least one flexible OCA layer having a thickness that is substantially an odd or even multiple of one-eighth of a wavelength corresponding to ultrasonic waves in the range from 1 MHz to 14 MHz. In this context, "substantially" means within plus or minus 10%.

In this example, acoustic resonator 4 is bounded by the display glass layer 419 and the outer surface 422 of the apparatus 101. The acoustic resonator 4 includes the protective film layer 445 and the OCA layer 440, both of which reside between the display glass layer 419 and the outer surface 422. The protective film layer 445 may, for example, include a colorless polyamide (CPI), polymethyl methacrylate (PMMA), etc. Acoustic resonator 4 may be configured to cause a local maximum of ultrasonic wave transmission. In some such examples, acoustic resonator 4 may have a thickness corresponding to a multiple of a quarter wavelength at a frequency in the range from 1 MHz-15 MHz. If flexible OCA materials such as those described above are used as the OCA layer 440, having an OCA layer 440 thickness in the range from 10 microns to 40 microns—such as 20 microns, 21 microns, 22 microns, 23 microns, 24 microns, 25 microns, 26 microns, 27 microns, 28 microns, 29 microns, 30 microns, etc.—can improve performance over some ranges of temperature, such as for relatively lower temperatures. Moreover, if such flexible OCA materials are used as the OCA layer 440, having an OCA layer 440 thickness in the range from 60 microns to 90 microns—such as 70 microns, 71 microns, 72 microns, 73 microns, 74 microns, 75 microns, 76 microns, 77 microns, 78 microns, 79 microns, 80 microns, etc.—can improve performance over some ranges of temperature. More generally, in some examples, acoustic resonator 4 may include at least one flexible OCA layer having a thickness that is substantially an odd or even multiple of one-eighth of a wavelength corresponding to ultrasonic waves in the range from 1 MHz to 14 MHz. In this context, "substantially" means within plus or minus 10%. In some examples, the flexible OCA layer may have a thickness in the range from 5 microns to 180 microns.

In some examples, the apparatus also may include the acoustic resonator 1 that is described with reference to FIG. 2, the acoustic resonator 2 that is described with reference to FIG. 2, or both.

The present inventors have determined that there is an inverse relationship between the thickness of the OCA layers 407 and 440 and the resolution of ultrasonic image data obtained by the ultrasonic fingerprint sensor system 102. In other words, a decreased thickness of the OCA layers 407 and 440 results in an increased resolution.

Figure 5:
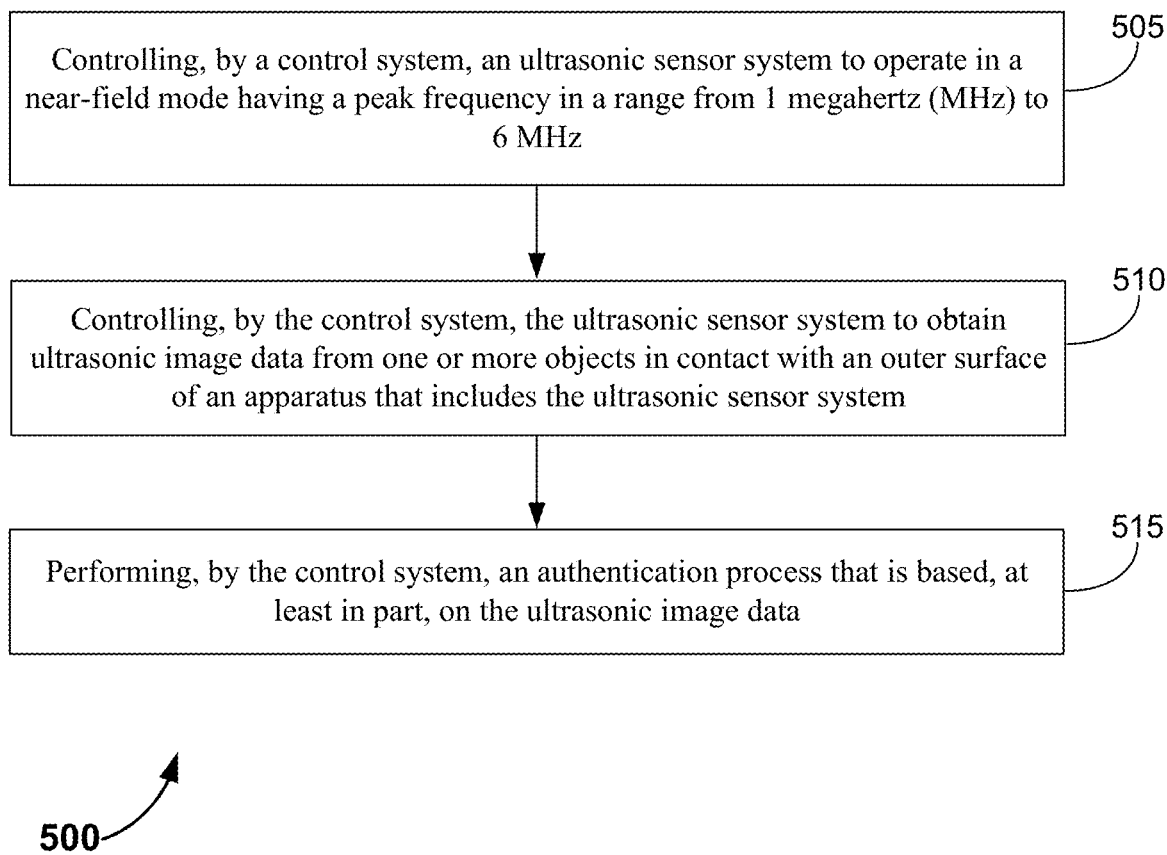
FIG. 5 is a flow diagram that presents examples of operations according to some disclosed methods.

FIG. 5 is a flow diagram that presents examples of operations according to some disclosed methods. The blocks of FIG. 5 may be performed by an apparatus that includes at least an ultrasonic fingerprint sensor system and a control system. The blocks of FIG. 5 may, for example, be performed by the apparatus 101 of FIG. 1B or by a similar apparatus. For example, in some implementations the control system 106 of FIG. 1B may be configured to perform, at least in part, the operations that are described herein with reference to FIG. 5. In some examples, the apparatus may be a mobile device, such as a cellular telephone. However, in other examples, the apparatus may be another type of device, such as a tablet, a laptop, an automobile or component thereof, a door access control device, a wearable device, etc. As with other methods disclosed herein, the methods outlined in FIG. 5 may include more or fewer blocks than indicated. Moreover, the blocks of methods disclosed herein are not necessarily performed in the order indicated. In some implementations, one or more blocks may be performed concurrently.

According to this example, method 500 involves controlling an apparatus that includes an ultrasonic fingerprint sensor system. In some examples, method 500 may involve controlling the apparatus 101 shown in FIG. 1, the apparatus 101 shown in FIG. 2, the apparatus 101 shown in FIG. 4, or a similar apparatus. In this example, block 505 involves controlling, by a control system, an ultrasonic fingerprint sensor system to operate in a near-field mode. In some examples, the control system 106 shown in FIG. 1 or FIG. 2 may control the fingerprint sensor system 102 in block 505. According to this example, block 505 involves controlling the ultrasonic fingerprint sensor system to transmit ultrasonic waves in a range from 1 MHz to 6 MHz.

In this example, block 510 involves controlling, by the control system, the ultrasonic fingerprint sensor system to obtain ultrasonic image data from one or more objects in contact with an outer surface of an apparatus that includes the ultrasonic fingerprint sensor system. According to some examples, block 510 may involve obtaining ultrasonic image data from one or more digits in contact with an outer surface of the apparatus 101.

According to this example, block 515 involves performing, by the control system, an authentication process that is based, at least in part, on the ultrasonic image data. Block 515 may involve a fingerprint-based authentication process. For example, block 515 may involve obtaining fingerprint features (such as fingerprint minutiae) from the ultrasonic image data and comparing the fingerprint features with previously-obtained fingerprint features. The previously-obtained fingerprint features may, for example, have been obtained during an enrollment process.

Implementation examples are described in the following numbered clauses:

1. A foldable display device, including: a display system including a display stack; an ultrasonic fingerprint sensor system including an ultrasonic fingerprint sensor system stack; and a stiffener layer residing between the display stack and the ultrasonic fingerprint sensor system stack, the stiffener layer having a stiffener layer thickness configured to allow the ultrasonic fingerprint sensor system to operate in a near-field mode having a peak frequency in a range from 1 megahertz (MHz) to 6 MHz.
2. The foldable display device of clause 1, where operation of the ultrasonic fingerprint sensor system in the near-field mode provides a resolution of at least 3 line pairs per millimeter.
3. The foldable display device of clause 1 or clause 2, where the stiffener layer thickness corresponds with a transmission coefficient in a range from 10 percent to 30 percent for ultrasonic waves in the range from 1 MHz to 6 MHz.
4. The foldable display device of any one of clauses 1-3, where the stiffener layer includes stainless steel, titanium, aluminum, carbon fiber reinforced polymer (CFRP), glass fiber reinforced polymer (GFRP), or combinations thereof.
5. The foldable display device of clause 4, where the stiffener layer includes a stainless steel layer, a titanium layer, a CFRP layer or a GFRP layer having a thickness in a range from 30 microns to 200 microns, or an aluminum layer having a thickness in a range from 100 microns to 300 microns.
6. The foldable display device of any one of clauses 1-5, further including an adhesive layer residing on a side of the stiffener layer proximate the display stack, the adhesive layer having a thickness of less than 100 microns.
7. The foldable display device of any one of clauses 1-6, where the display stack includes a display glass layer residing between the stiffener layer and an outer surface of the foldable display device, the display glass layer including glass, transparent plastic, or a combination thereof, where a first acoustic resonator is bounded by the stiffener layer and the display glass layer, the first acoustic resonator being configured to cause a first local maximum of ultrasonic wave transmission.
8. The foldable display device of clause 7, where the first acoustic resonator includes at least one first-resonator flexible optically clear adhesive (OCA) layer, the at least one first-resonator flexible OCA layer having a thickness that is substantially an odd or even multiple of one-eighth of a wavelength corresponding to ultrasonic waves in the range from 1 MHz to 14 MHz, where substantially indicates being within plus or minus 10 percent.
9. The foldable display device of clause 7, further including one or more layers residing between the display glass layer and the outer surface of the foldable display device, where a second acoustic resonator includes the one or more layers and the display glass layer.
10. The foldable display device of clause 9, where the one or more layers includes a second-resonator flexible optically clear adhesive (OCA) layer having a thickness in a range from 5 microns to 180 microns.
11. The foldable display device of any one of clauses 1-10, where the stiffener layer thickness is less than one-fifth of a wavelength corresponding to the peak frequency.
12. The foldable display device of any one of clauses 1-11, where the display stack includes one or more display stack layers in which a sound speed is above a sound speed threshold, the one or more display stack layers each having a thickness that is less than one-fifth of a wavelength corresponding to the peak frequency.
13. The foldable display device of clause 12, where the sound speed threshold is in a range from 2000-2500 meters per second.
14. The foldable display device of any one of clauses 1-13, further including a control system configured to: control the ultrasonic fingerprint sensor system to obtain ultrasonic image data from one or more objects in contact with an outer surface of the foldable display device; and perform an authentication process that is based, at least in part, on the ultrasonic image data.
15. The foldable display device of clause 14, where the one or more objects include one or more digits and where the authentication process is a fingerprint-based authentication process.
16. A foldable display device, including: a display system including a display stack; an ultrasonic fingerprint sensor system configured to operate in a near-field mode having a peak frequency in a range from 1 megahertz (MHz) to 6 MHz, the ultrasonic fingerprint sensor system including an ultrasonic fingerprint sensor system stack; and a stiffener layer residing between the display stack and the ultrasonic fingerprint sensor system stack, the stiffener layer having a stiffener layer thickness that is less than one-fifth of a wavelength corresponding to the peak frequency.
17. The foldable display device of clause 16, where the display stack includes one or more display stack layers in which a sound speed is above a sound speed threshold, the one or more display stack layers each having a thickness that is less than one-fifth of a wavelength corresponding to the peak frequency.
18. The foldable display device of clause 17, where the sound speed threshold is 2500 meters per second.
19. The foldable display device of any one of clauses 16-18, where operation of the ultrasonic fingerprint sensor system in the near-field mode provides a resolution of at least 3 line pairs per millimeter.
20. The foldable display device of any one of clauses 16-19, where the stiffener layer thickness corresponds with a transmission coefficient in a range from 10 percent to 30 percent for ultrasonic waves in the range from 3 MHz to 6 MHz.
21. The foldable display device of any one of clauses 16-20, where the stiffener layer includes stainless steel, titanium, aluminum, carbon fiber reinforced polymer (CFRP), glass fiber reinforced polymer (GFRP), or combinations thereof.
22. The foldable display device of any one of clauses 16-21, where the stiffener layer includes a stainless steel layer, a titanium layer, a CFRP layer or a GFRP layer having a thickness in a range from 30 microns to 200 microns, or an aluminum layer having a thickness in a range from 100-300 microns.
23. The foldable display device of any one of clauses 16-22, further including an adhesive layer residing on a side of the stiffener layer proximate the display stack, the adhesive layer having a thickness of less than 100 microns.

25. The foldable display device of clause 24, where the first acoustic resonator includes at least one first-resonator flexible optically clear adhesive (OCA) layer, the at least one first-resonator flexible OCA layer having a thickness that is substantially an odd or even multiple of one eighth of a wavelength corresponding to ultrasonic waves in the range from 1 MHz to 14 MHz, where substantially indicates being within plus or minus 10 percent.

27. The foldable display device of clause 26, where the one or more layers includes a second-resonator flexible optically clear adhesive (OCA) layer having a thickness corresponding to an odd multiple of one eighth of a wavelength corresponding to ultrasonic waves in the range from 1 MHz to 14 MHz plus or minus 10 percent.

26. The foldable display device of any one of clauses 16-25, where the ultrasonic fingerprint sensor system includes a thin film transistor (TFT) layer or a semiconductor layer, where an acoustic resonator includes the stiffener layer and the TFT layer or the semiconductor layer, the acoustic resonator being configured to cause a first local maximum of ultrasonic wave transmission.

27. The foldable display device of any one of clauses 16-26, where the ultrasonic fingerprint sensor system includes a thin film transistor (TFT) layer, a piezoelectric layer and a backing layer, where an acoustic resonator includes the TFT layer, the piezoelectric layer and the backing layer, the acoustic resonator being configured to cause a first local maximum of ultrasonic wave transmission.

28. The foldable display device of any one of clauses 16-27, further including a control system configured to: control the ultrasonic fingerprint sensor system to obtain ultrasonic image data from one or more objects in contact with an outer surface of the foldable display device; and perform an authentication process that is based, at least in part, on the ultrasonic image data.

29. The foldable display device of clause 28, where the one or more objects include one or more digits and where the authentication process is a fingerprint-based authentication process.

30. A method, including: controlling, by a control system, an ultrasonic fingerprint sensor system to operate in a near-field mode having a peak frequency in a range from 1 megahertz (MHz) to 6 MHz; controlling, by the control system, the ultrasonic fingerprint sensor system to obtain ultrasonic image data from one or more objects in contact with an outer surface of an apparatus that includes the ultrasonic fingerprint sensor system; and performing, by the control system, an authentication process that is based, at least in part, on the ultrasonic image data.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

What is claimed is:

1. A foldable display device, comprising:
a display system including a display stack;
an ultrasonic fingerprint sensor system including an ultrasonic fingerprint sensor system stack; and
a stiffener layer residing between the display stack and the ultrasonic fingerprint sensor system stack, the stiffener layer having a stiffener layer thickness configured to allow the ultrasonic fingerprint sensor system to operate in a near-field mode having a peak frequency in a range from 1 megahertz (MHz) to 6 MHz, wherein the stiffener layer thickness corresponds to a transmission coefficient in a range from 10 percent to 30 percent for ultrasonic waves in the range from 1 MHz to 6 MHz.

2. The foldable display device of claim 1, wherein operation of the ultrasonic fingerprint sensor system in the near-field mode provides a resolution of at least 3 line pairs per millimeter.

3. The foldable display device of claim 1, wherein the stiffener layer includes stainless steel, titanium, aluminum, carbon fiber reinforced polymer (CFRP), glass fiber reinforced polymer (GFRP), or combinations thereof.

4. The foldable display device of claim 3, wherein the stiffener layer comprises a stainless steel layer, a titanium layer, a CFRP layer or a GFRP layer having a thickness in a range from 30 microns to 200 microns, or an aluminum layer having a thickness in a range from 100 microns to 300 microns.

5. The foldable display device of claim 1, further comprising an adhesive layer residing on a side of the stiffener layer proximate the display stack, the adhesive layer having a thickness of less than 100 microns.

6. The foldable display device of claim 1, wherein the display stack includes a display glass layer residing between the stiffener layer and an outer surface of the foldable display device, the display glass layer comprising glass, transparent plastic, or a combination thereof, wherein a first acoustic resonator is bounded by the stiffener layer and the display glass layer, the first acoustic resonator being configured to cause a first local maximum of ultrasonic wave transmission.

7. The foldable display device of claim 6, wherein the first acoustic resonator includes at least one first-resonator flexible optically clear adhesive (OCA) layer, the at least one first-resonator flexible OCA layer having a thickness that is substantially an odd or even multiple of one-eighth of a wavelength corresponding to ultrasonic waves in the range from 1 MHz to 14 MHz, wherein substantially indicates being within plus or minus 10 percent.

8. The foldable display device of claim 6, further comprising one or more layers residing between the display glass layer and the outer surface of the foldable display device, wherein a second acoustic resonator comprises the one or more layers and the display glass layer.

9. The foldable display device of claim 8, wherein the one or more layers includes a second-resonator flexible optically clear adhesive (OCA) layer having a thickness in a range from 5 microns to 180 microns.

10. The foldable display device of claim 8, wherein the one or more layers includes a second-resonator flexible optically clear adhesive (OCA) layer having a thickness in a range from 5 microns to 180 microns.

11. The foldable display device of claim 6, further comprising one or more layers residing between the display glass layer and the outer surface of the foldable display device, wherein a second acoustic resonator comprises the one or more layers and the display glass layer.

12. The foldable display device of claim 1, wherein the stiffener layer thickness is less than one-fifth of a wavelength corresponding to the peak frequency.

13. The foldable display device of claim 1, wherein the display stack includes one or more display stack layers in which a sound speed is above a sound speed threshold, the one or more display stack layers each having a thickness that is less than one-fifth of a wavelength corresponding to the peak frequency.

14. The foldable display device of claim 13, wherein the sound speed threshold is in a range from 2000-2500 meters per second.

15. The foldable display device of claim 1, further comprising a control system configured to:

control the ultrasonic fingerprint sensor system to obtain ultrasonic image data from one or more objects in contact with an outer surface of the foldable display device; and perform an authentication process that is based, at least in part, on the ultrasonic image data.

16. The foldable display device of claim 15, wherein the one or more objects include one or more digits and wherein the authentication process is a fingerprint-based authentication process.

17. A foldable display device, comprising:
a display system including a display stack;
an ultrasonic fingerprint sensor system configured to operate in a near-field mode having a peak frequency in a range from 1 megahertz (MHz) to 6 MHz, the ultrasonic fingerprint sensor system including an ultrasonic fingerprint sensor system stack; and
a stiffener layer residing between the display stack and the ultrasonic fingerprint sensor system stack, the stiffener layer having a stiffener layer thickness that is less than one-fifth of a wavelength corresponding to the peak frequency, wherein the stiffener layer comprises a stainless steel layer, a titanium layer, a carbon fiber reinforced polymer (CFRP) layer or a glass fiber reinforced polymer (GFRP) layer having a thickness in a range from 30 microns to 200 microns, or an aluminum layer having a thickness in a range from 100-300 microns.

18. The foldable display device of claim 17, wherein the display stack includes one or more display stack layers in which a sound speed is above a sound speed threshold, the one or more display stack layers each having a thickness that is less than one-fifth of a wavelength corresponding to the peak frequency.

19. The foldable display device of claim 18, wherein the sound speed threshold is 2500 meters per second.

20. The foldable display device of claim 17, wherein operation of the ultrasonic fingerprint sensor system in the near-field mode provides a resolution of at least 3 line pairs per millimeter.

21. The foldable display device of claim 17, wherein the stiffener layer thickness corresponds to a transmission coefficient in a range from 10 percent to 30 percent for ultrasonic waves in the range from 3 MHz to 6 MHz.

22. The foldable display device of claim 17, further comprising an adhesive layer residing on a side of the stiffener layer proximate the display stack, the adhesive layer having a thickness of less than 100 microns.

23. The foldable display device of claim 17, further comprising a display cover layer residing between the display stack and an outer surface of the foldable display device, the display cover layer comprising glass, transparent plastic, or a combination thereof, wherein a first acoustic resonator comprises the stiffener layer, the display stack and the display cover layer, the first acoustic resonator being configured to cause a first local maximum of ultrasonic wave transmission.

24. The foldable display device of claim 23, wherein the first acoustic resonator includes at least one first-resonator flexible optically clear adhesive (OCA) layer, the at least one first-resonator flexible OCA layer having a thickness that is substantially an odd or even multiple of one eighth of a wavelength corresponding to ultrasonic waves in the range from 1 MHz to 14 MHz, wherein substantially indicates being within plus or minus 10 percent.

25. The foldable display device of claim 23, further comprising one or more layers residing between the display cover layer and the outer surface of the foldable display device, wherein a second acoustic resonator comprises the one or more layers and the display cover layer.

26. The foldable display device of claim 25, wherein the one or more layers includes a second-resonator flexible optically clear adhesive (OCA) layer having a thickness corresponding to an odd multiple of one eighth of a wavelength corresponding to ultrasonic waves in the range from 1 MHz to 14 MHz plus or minus 10 percent.

27. The foldable display device of claim 17, wherein the ultrasonic fingerprint sensor system includes a thin film transistor (TFT) layer or a semiconductor layer, wherein an acoustic resonator comprises the stiffener layer and the TFT layer or the semiconductor layer, the acoustic resonator being configured to cause a first local maximum of ultrasonic wave transmission.

28. The foldable display device of claim 17, wherein the ultrasonic fingerprint sensor system includes a thin film transistor (TFT) layer, a piezoelectric layer and a backing layer, wherein an acoustic resonator comprises the TFT layer, the piezoelectric layer and the backing layer, the acoustic resonator being configured to cause a first local maximum of ultrasonic wave transmission.

29. A foldable display device, comprising:
a display system including a display stack;
an ultrasonic fingerprint sensor system including an ultrasonic fingerprint sensor system stack; and
a stiffener layer residing between the display stack and the ultrasonic fingerprint sensor system stack, the stiffener layer having a stiffener layer thickness configured to allow the ultrasonic fingerprint sensor system to operate in a near-field mode having a peak frequency in a range from 1 megahertz (MHz) to 6 MHz, wherein:
the display stack includes a display glass layer residing between the stiffener layer and an outer surface of the foldable display device, the display glass layer comprising glass, transparent plastic, or a combination thereof;
a first acoustic resonator is bounded by the stiffener layer and the display glass layer, the first acoustic resonator being configured to cause a first local maximum of ultrasonic wave transmission; and
the first acoustic resonator includes at least one first-resonator flexible optically clear adhesive (OCA) layer, the at least one first-resonator flexible OCA layer having a thickness that is substantially an odd or even multiple of one-eighth of a wavelength corresponding to ultrasonic waves in the range from 1 MHz to 14 MHz, wherein substantially indicates being within plus or minus 10 percent.

* * * * *